United States Patent
Lee et al.

(10) Patent No.: US 11,911,912 B2
(45) Date of Patent: Feb. 27, 2024

(54) ROBOT CONTROL APPARATUS AND METHOD FOR LEARNING TASK SKILL OF THE ROBOT

(71) Applicant: Samsung Electronics Co., Ltd., Suwon-si (KR)

(72) Inventors: Sohee Lee, Suwon-si (KR); Junhong Min, Suwon-si (KR); Kyungshik Roh, Suwon-si (KR); Sukjune Yoon, Suwon-si (KR); Minyong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 17/309,673

(22) PCT Filed: Dec. 12, 2019

(86) PCT No.: PCT/KR2019/017588
§ 371 (c)(1),
(2) Date: Jun. 14, 2021

(87) PCT Pub. No.: WO2020/122632
PCT Pub. Date: Jun. 18, 2020

(65) Prior Publication Data
US 2022/0024037 A1   Jan. 27, 2022

(30) Foreign Application Priority Data
Dec. 14, 2018  (KR) .................. 10-2018-0162456

(51) Int. Cl.
B25J 13/08  (2006.01)
B25J 19/02  (2006.01)
(Continued)

(52) U.S. Cl.
CPC .......... *B25J 9/1671* (2013.01); *B25J 9/1697* (2013.01); *B25J 13/08* (2013.01); *G05B 13/0265* (2013.01);
(Continued)

(58) Field of Classification Search
CPC ........ B25J 9/1671; B25J 9/1697; B25J 13/08; B25J 19/023; B25J 9/163; B25J 9/1602;
(Continued)

(56) References Cited

U.S. PATENT DOCUMENTS 9,701,015 B2    7/2017  Buehler et al.
9,811,074 B1 *  11/2017  Aichele .................. B25J 9/1656
(Continued)

FOREIGN PATENT DOCUMENTS

CA      3071332 A1 *  1/2019  .............. B25J 9/162
JP      2018-43338 A    3/2018
(Continued)

OTHER PUBLICATIONS

International Search Report dated Mar. 23, 2020 in connection with International Patent Application No. PCT/KR2019/017588, 3 pages.
(Continued)

*Primary Examiner* — Adam R Mott
*Assistant Examiner* — Heather J Keniry (57) ABSTRACT

A robot device according to various embodiments comprises a camera, a robot arm, and a control device electrically connected to the camera and the robot arm, wherein the control device can be configured to collect a robot arm control record about a random operation, acquire, from the camera, a camera image in which a working space of the robot arm is photographed, implement an augmented reality model by rendering a virtual object corresponding to an object related to objective work in the camera image, and update a control policy for the objective work by performing
(Continued)

image-based policy learning on the basis of the augmented reality model and the control record.

15 Claims, 6 Drawing Sheets

(51) Int. Cl.
*B25J 9/16* (2006.01)
*G05B 13/02* (2006.01)
*G06N 20/00* (2019.01)
*G06T 19/00* (2011.01)
*G06T 7/70* (2017.01)
*G06V 10/22* (2022.01)
*G06V 20/20* (2022.01)

(52) U.S. Cl.
CPC ............ *G06T 19/006* (2013.01); *G06V 20/20* (2022.01); *G05B 2219/32014* (2013.01); *G05B 2219/39001* (2013.01)

(58) Field of Classification Search
CPC .............. B25J 9/1658; G05B 13/0265; G05B 2219/32014; G05B 2219/39001; G05B 2219/40499; G05B 2219/40607; G06T 19/006; G06T 7/70; G06V 20/20; G06V 10/225; G06N 20/00
See application file for complete search history.

(56) References Cited

U.S. PATENT DOCUMENTS

| | | | |
|---|---|---|---|
| RE48,056 E * | 6/2020 | Hoffberg | G06F 3/00 |
| 10,671,240 B2 | 6/2020 | Gilbert et al. | |
| 10,766,136 B1 * | 9/2020 | Porter | G06N 3/045 |
| 10,766,137 B1 * | 9/2020 | Porter | G06N 3/04 |
| 11,145,123 B1 * | 10/2021 | Chor | G06V 20/20 |
| 2012/0053728 A1 | 3/2012 | Theodorus et al. | |
| 2013/0343640 A1 | 12/2013 | Buehler et al. | |
| 2015/0217449 A1 * | 8/2015 | Meier | G05D 1/0088 901/1 |
| 2017/0129101 A1 | 5/2017 | Sonoda | |
| 2017/0232615 A1 | 8/2017 | Hammock | |
| 2018/0079076 A1 | 3/2018 | Toda | |
| 2019/0026952 A1 * | 1/2019 | Bordeaux | G06V 10/987 |
| 2019/0069962 A1 | 3/2019 | Tabandeh et al. | |
| 2019/0232488 A1 | 8/2019 | Levine et al. | |

FOREIGN PATENT DOCUMENTS

| | | | |
|---|---|---|---|
| JP | 2018-118343 A | 8/2018 | |
| KR | 10-2012-0027253 A | 3/2012 | |
| KR | 20170053585 A | 5/2017 | |
| KR | 20180058895 A | 6/2018 | |
| KR | 20180113512 A | 10/2018 | |
| WO | 2018/053187 A1 | 3/2018 | |
| WO | WO-2018236753 A1 * | 12/2018 | B25J 9/161 |

OTHER PUBLICATIONS

Written Opinion of the International Searching Authority dated Mar. 23, 2020 in connection with International Patent Application No. PCT/KR2019/017588, 4 pages.

Office Action dated Sep. 22, 2023, in connection with Korean Patent Application No. 10-2018-0162456, 4 pages.

* cited by examiner

ROBOT CONTROL APPARATUS AND METHOD FOR LEARNING TASK SKILL OF THE ROBOT

CROSS-REFERENCE TO RELATED APPLICATIONS

This application is a 371 of International Application No. PCT/KR2019/017588 filed on Dec. 12, 2019, which claims priority to Korean Patent Application No. 10-2018-0162456 filed on Dec. 14, 2018, the disclosures of which are herein incorporated by reference in their entirety.

BACKGROUND

1. Field

The disclosure relates to a robot device and a method for learning task skills by a robot using augmented reality.

2. Description of Related Art

Artificial intelligence (AI) technology is a branch of computer engineering technology that studies how computers can think, learn, and judge in logical ways like humans. The artificial intelligence technology is technology that enables computers to imitate the intelligent behavior of humans, and with the development of artificial intelligence, robot devices are continuously being developed. Recently, intelligent robots that recognize a surrounding environment by themselves and then adjust and determine their actions, have emerged. Such intelligent robots are capable of detecting various environmental elements from a surrounding environment by themselves, and capable of providing various task services useful to humans based thereon.

The intelligent robots may acquire a control policy for performing a final task through motion learning. Motion learning may mean a series of processes in which a robot device generates an optimized control policy (or a control model) through a trial and error method by itself, without an operator's teaching or a series of previously designed regular instruction sets input thereto, in connection with, for example, a motion of moving a robot arm to hold and lift an object located at a specific position and place the object at a target position, or a motion of moving a robot arm to hold and assemble two objects.

Motion learning is to find variable parameters for a task motion based on the state/torque information of a robot, and these variable parameters may be updated through supervised learning and reinforcement learning. The goal of motion learning may be acquiring a control policy function that derives an optimized control input equation for performing a desired motion of a task. For example, in reinforcement learning, a random motion may be attempted (trial), determination as to whether the task is successful (error) may be received as a reward, the policy for generating the corresponding motion may be corrected, and the learning processes are repeatedly performed a sufficient number of times to find an optimized solution.

When it is necessary for an actual robot to move during the motion learning of the robot, the learning time may be long, a task object or a task environment factor (e.g., a task tool) may be damaged when the task fails, or the robot device may be damaged by colliding with other parts within a task space. Alternatively, when replacing a robot's motion learning with simulation, the simulation environment is usually different from the actual environment, and a robot replacement model for simulation has an error with respect to an actual robot. For this reason, when a robot performs a task in an actual environment based on simulation data used for learning, accuracy is degraded.

Various embodiments are intended to propose a method of improving the accuracy of task skills by minimizing an error range with respect to an actual environment while reducing risk factors that may occur in learning a motion technique of a robot device and shortening a learning time.

SUMMARY

A robot device according to various embodiments may include a camera, a robot arm, and a control device electrically connected to the camera and the robot arm. The control device may be configured to: collect control records of the robot arm for a random motion; acquire, from the camera, a camera image in which the task space of the robot arm is photographed; implement an augmented reality model by rendering a virtual object corresponding to an object related to a target task in the camera image; perform image-based policy learning based on the augmented reality model and the control records, and update control policy for the target task.

A method of learning a task skill by a robot device according to various embodiments may include: an operation of collecting control records of the robot arm for a random motion; an operation of acquiring from the camera a camera image in which the task space of the robot arm is photographed; an operation of implementing an augmented reality model by rendering a virtual object corresponding to an object related to a target task in the camera image; an operation of performing image-based policy learning based on the augmented reality model and the control records; and an operation of updating the control policy for the target task in response to a result of the image-based learning.

According to various embodiments, in learning a task motion by a robot, it is possible to improve the accuracy of the task skills of the robot while safely protecting an actual task-target object and the robot without using an actual object using data on the actual task environment of the robot.

According to various embodiments, by performing motion learning of a robot using an augmented reality model, it is possible to find an optimized solution in performing a task while reducing an error of the robot with respect to an actual work environment and shortening a learning time.

DETAILED DESCRIPTION

A robot device 101 according to various embodiments disclosed herein may be any of various types of electronic devices. A robot device may be, for example, a control device or a control module, but is not limited thereto, and may include various devices capable of controlling the robot device in a task space, such as a portable communication device, a medical device, and a technology control device. The robot device 101 according to an embodiment disclosed herein is not limited to the above-mentioned devices.

In the following description, only some components of an electronic robot device are illustrated for convenience of description. In implementing an electronic robot device, essential components not mentioned below may be further included.

Figure 1:
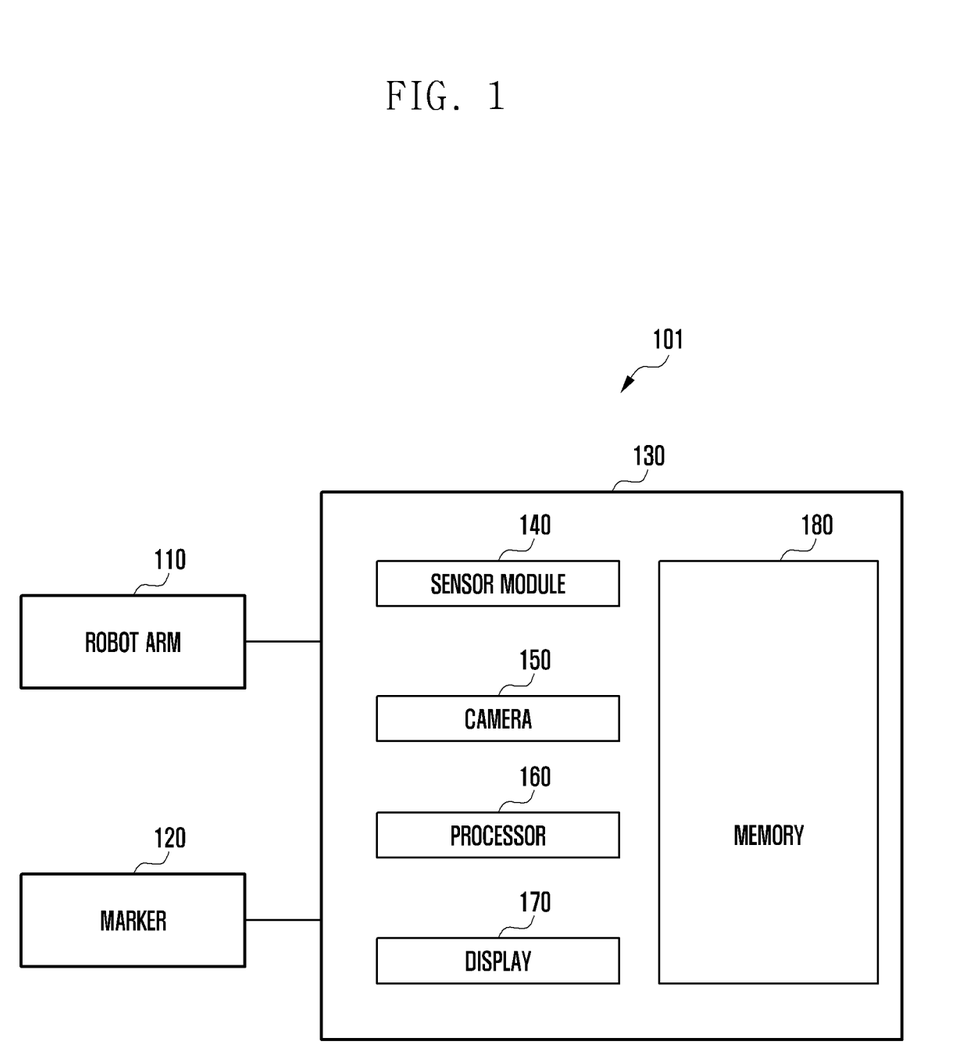
FIG. 1 is a block diagram of a robot device for learning a task according to various embodiments.

FIG. 1 is a system block diagram of a robot device for learning a task according to various embodiments.

Referring to FIG. 1, a robot device 101 according to various embodiments may include a robot arm 110, a marker 120, and a control device 130. The control device 130 may be electrically connected to the robot arm 110, may drive the robot arm 110, and may control the motion of the robot arm 110.

The robot arm 110 according to various embodiments may be used to perform a task in a task space according to the use of the robot under the control of the control device 130. The task of the robot may be, for example, a motion of holding a specific object and placing the object at a different position using the robot arm or a motion of holding and assembling two objects using the robot arm, but may be changed according to the use of the robot. The robot arm 110 according to an embodiment may be applied to a single-handed or double-handed robot device.

The marker 120 according to various embodiments may be an artificial mark used to identify a target, for example, a position (coordinates and azimuth) of an object on which the robot is to perform a task. The marker 120 may be indicated on the object or on a floor in the task space. The marker 120 may include at least one pattern. For example, the marker 120 may include a cross pattern, a straight line pattern, a T pattern, or the like, and the purpose of identifying the marker may be different depending on each pattern.

According to various implementations, the control device 130 may include a sensor module 140, a camera 150, a processor 160, a display 170, and a memory 180.

According to an embodiment, the sensor module 140 may detect an operating state of the robot device 101 or the environmental state of the work space, and may generate an electrical signal or data value corresponding to the detected state. The sensor module 140 may include, for example, a gesture sensor, a gyro sensor, a barometer sensor, a magnetic sensor, an acceleration sensor, and a grip sensor, a proximity sensor, an infrared (IR) sensor, a biometric sensor, a temperature sensor, a humidity sensor, or an illuminance sensor.

According to an embodiment, the camera 150 may capture a still image and a moving image of a task space and transmit the images to the processor 160. According to an embodiment, the camera 150 may include one or more lenses, image sensors, image signal processors, or flashes.

According to an embodiment, the camera 150 may be included in the control device 130, but may be implemented in a configuration separate from the control device 130. When the camera 150 is connected to the control device as a separate configuration, the camera 150 may be electrically connected to the control device 130, and the captured images acquired through the camera 150 may be provided to the control device 130.

According to various embodiments, the display 170 may visually provide information related to robot control.

According to an embodiment, the display 170 may be implemented as a configuration separate from the control device 130, and may be used for a purpose of providing images of a task environment for robot control or information on a task result to an operator outside the task space.

According to various embodiments, the memory 180 may store various data to be used by at least one component of the robot device 101 (e.g., the processor 160 or the sensor module 140). The data may include, for example, input data or output data for software (e.g., control program) and instructions associated therewith. The memory 180 may include a volatile memory or a non-volatile memory.

According to various embodiments, the processor 160 may control the robot arm 110, the sensor module 140, the camera 150, and the display 170, and may perform various data processing or arithmetic operations related to robot control. According to an embodiment, as at least part of data processing or arithmetic operations, the processor 160 may load an instruction or data received from a component of the robot device into a volatile memory, may process an instruction or data stored in the volatile memory, may store the result data in a non-volatile memory. The program may be stored as software in the memory 180, and may include, for example, an operating system (OS), middleware, or a program.

According to an embodiment, the processor 160 may include a main processor (e.g., a central processing unit (CPU) or an application processor (AP)), and a secondary processor 123 that can be operated independently or together therewith (e.g., a graphics processing unit (GPU), an image signal processor (ISP), a sensor hub processor, or a communication processor (CP)). Additionally or alternatively, the auxiliary processor may be configured to use power lower than that of the main processor, or to be specialized for a designated function. The auxiliary processor may be implemented separately from the main processor or as part of the main processor.

According to various embodiments, the processor 160 may perform control to: collect control records of the robot arm for a random motion; acquire, from the camera 150, a camera image in which the task space of the robot arm 110 is photographed; implement an augmented reality model by rendering a virtual object corresponding to an object related to a target task in the camera image; perform image-based policy learning based on the augmented reality model and the control records; and update the control policy for the target task in response to the image-based learning result.

According to various embodiments, the processor 160 may be configured to: collect control records of the robot arm 110 for a random motion, acquire state information of the robot arm 110, acquire location information of a task-target object and posture information of the object, acquire a torque input value required for driving the robot arm 110, acquire a random control policy based on the state information of the robot arm 110, the location and posture information of the object, and the torque input value required for driving the robot arm 110, perform non-video-based policy learning based on the random control policy, acquire, from the camera 150, a camera image obtained by imaging the task space of the robot arm 110, implement an augmented reality model by rendering a virtual object corresponding to an object related to a target task in the camera image, and perform control so as to perform image-based policy learning based on a result of the non-image-based policy learning and the augmented reality model and to update the control policy for the target task.

According to various embodiments, the processor 160 may recognize the marker 120 based on the camera image in which the task space is photographed. As another example, the processor 160 may recognize the marker 120 by receiving spatial coordinates in which the marker is located and measuring a length and a direction of the position at which the marker 120 is located based on the robot arm 110. For example, the processor 160 may check the start and end points of a task based on the position information of at least one marker, and may teach the start and end of the robot task.

According to various embodiments, the processor 160 may be configured to: recognize a marker 120 for position identification in the camera image acquired through the camera 150, measure the position of the recognized marker 120 and the position of the robot arm 110, implement an augmented reality model (or an augmented reality image) by rendering a virtual object corresponding to a task-target object to be located at the position of the marker 120 recognized in the camera image.

The processor 160 according to various embodiments may be configured to: acquire information about whether other components around the robot arm 110 are adjacent to the robot while performing a task using the robot arm 110 and whether the robot fails to grip an object through the sensor module 140, and control the robot to stop and/or retry the task based on the sensor information.

According to various embodiments, in addition to the above-described configuration, the robot device 101 may but, not exclusively, further include: an input device configured to receive instructions or data for use in a component (e.g., the processor 160) of the robot device 101 from the outside (e.g., the user) of the control device 130; a power supply module configured to supply power to the robot device and the control device; and a communication module for communicating with an externally implemented camera and/or a display, or a component of a communication interface for connection with an external device.

Hereinafter, for convenience of description, the robot device 101 will be described as being controlled by the control device 130, but it may be understood that the operation of the control device 130 is controlled by the processor 160 of FIG. 1.

Figure 2:
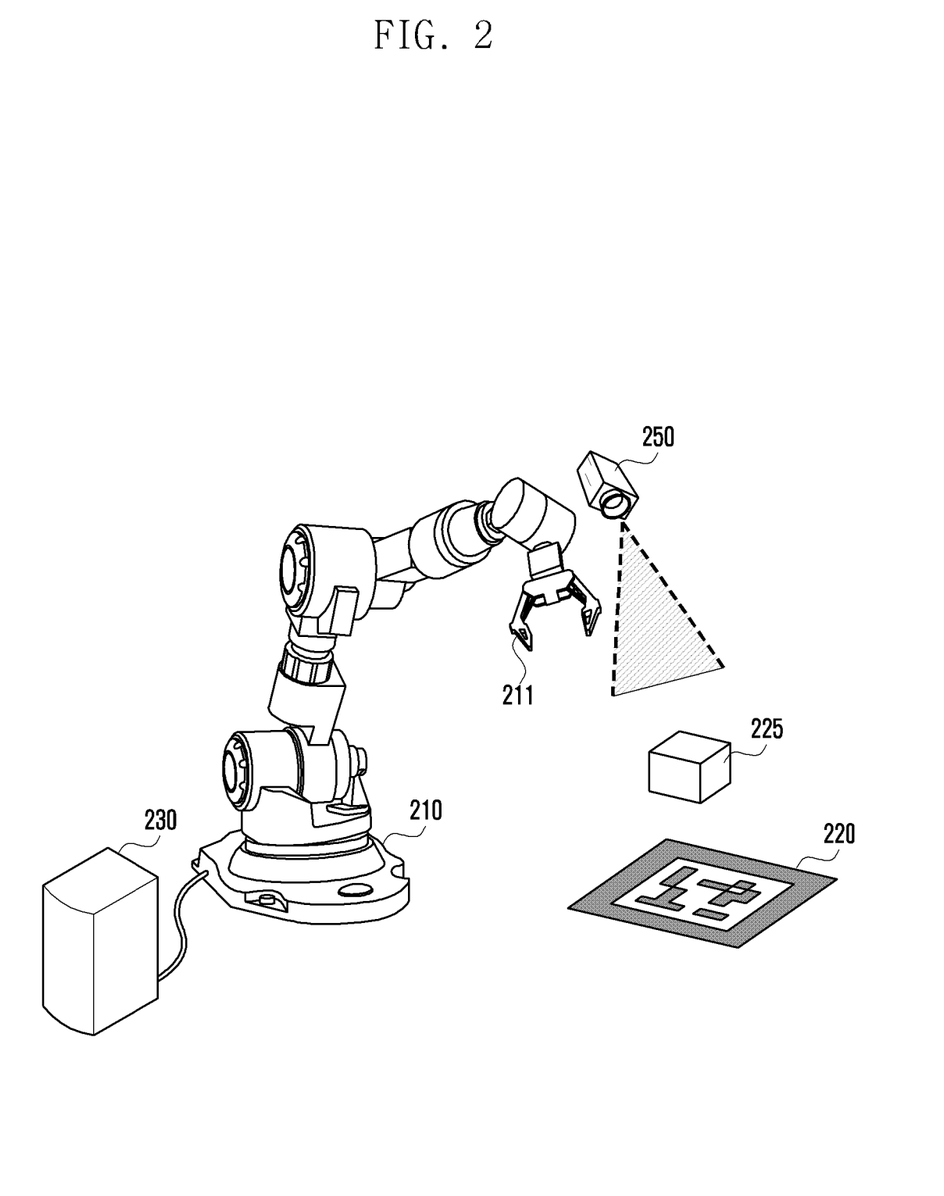
FIG. 2 illustrates a task environment of a robot device for learning a task according to various embodiments.

FIG. 2 illustrates a task environment of a robot device for learning a task according to various embodiments.

Referring to FIG. 2, according to various embodiments, a robot device (e.g., the robot device 101 in FIG. 1) may instruct a robot arm 210 (e.g., the robot arm 110 in FIG. 1) to perform a task based on the position at which a marker 220 (e.g., the marker 120 in FIG. 1) is located. The robot device may be configured to: photograph an actual task space in which the robot arm 220 is located using a camera 250 (e.g., the camera 150 of FIG. 1), and implement an augmented reality model that renders a virtual object 225 corresponding to an actual task-target object at the position at which the marker 220 is placed in the captured camera image of the actual work space.

According to an embodiment, the robot arm 210 may be fixed to the floor by a support part that supports the robot arm 210. The robot arm 210 may be implemented to be rotated or to change the position and/or the posture thereof through at least one motor (not illustrated). The robot arm 210 may be provided with at least one joint driving unit (not illustrated), and may be implemented to move along lines of various shapes such as a curved line so as to perform various tasks. Components constituting the robot arm (e.g., a motor, a joint drive unit, etc.) may be implemented in various forms according to the use and implementation form of the robot. The components are described here for convenience of description, but the disclosure is not limited thereto.

According to an embodiment, the robot arm 210 may further include, at an end, an operation unit 211 so as to allow the robot to perform a task according to a purpose. The operation unit 211 may be implemented as a gripper capable of mounting (or gripping) an object, for example, as illustrated in FIG. 2, but is not limited thereto. The operation unit may be configured in various forms depending on the type of tasks, such as a welding machine for welding. Alternatively, the robot arm 210 may be implemented such that the operation unit is replaceable. The robot arm 210 may be operated such that the operation unit 211 is located at the position of the task-target object under the control of the control device 230 (e.g., the control device 130 in FIG. 1). Depending on the number of robot arms 210, the lengths of the robot arms 210, the number of joint driving units, and the like, the task radius and the task accuracy of each robot arm 210 may vary.

According to an embodiment, the control device 230 may include the camera 250, but as illustrated in FIG. 2, the control device 230 and the camera 250 may be implemented as separate components. For example, the camera 250 may be installed in a task space in which the robot arm 210 is disposed. The camera 250 may be installed on the task space or on a wall in the task space so as to photograph the robot arm 210 and the task space, but is not limited thereto. In order to secure a visual field for the task space including the robot arm 210, the camera 250 may be installed next to the robot arm. Alternatively, the camera 250 may be installed in the form in which the camera 250 looks at the task space in front of the operation unit 211 of the robot arm 210 from a position just below the operation unit 211.

According to an embodiment, the robot device 101 may be configured to: generate a virtual object by rendering a task-target object in a camera image of the actual work space based on the camera image of the actual task space in which the robot arm 210 is located; and derive an optimized control input equation for performing a robot task by instructing the robot arm to repeat motion learning on the rendered virtual object.

A robot device according to various embodiments (e.g., the electronic device 101 in FIG. 1) may include: a camera (e.g., the camera 150 of FIG. 1 or the camera 250 in FIG. 2); a robot arm (e.g., the robot arm 110 in FIG. 1 or the robot arm 110 in FIG. 2); and a control device (e.g., the control device 130 in FIG. 1 or the control device 230 in FIG. 2) electrically connected to the camera and the robot arm. The control device may be configured to: collect control records of the robot arm for a random motion; acquire, from the camera, a camera image in which the task space of the robot arm is photographed; implement an augmented reality model by rendering a virtual object (e.g., the virtual object 225 in FIG. 2) corresponding to an object related to a target task in the camera image; and perform image-based policy learning based on the augmented reality model and the control records, and update a control policy for the target task.

According to various embodiments, the control device may be configured to: generate a random control policy function for the target task based on the control records of the robot arm; and update a variable parameter for the random control policy function by performing the image-based policy learning based on the acquired random control policy function.

According to various embodiments, the control policy may be a policy function for deriving a control input equation for driving the robot arm.

According to various embodiments, the control device may be configured to: acquire the state information of the robot arm; acquire position information and posture information of the object; and further perform non-image-based policy learning based on the state information of the robot arm, the position information and the posture information of the object, and a torque input value required for driving the robot arm.

According to various embodiments, in the image-based policy learning, supervised learning may be performed using a result of the non-image-based policy learning, or reinforcement learning may be performed based on image information on the augmented reality model in which the virtual object is implemented.

According to various embodiments, the non-image-based policy learning may be performed based on at least one of supervised learning, reinforcement learning, optimal control, and model predictive control.

According to various embodiments, the control device may be configured to: implement the augmented reality model by rendering the virtual object corresponding to the object on the captured camera image based on a 3D model.

According to various embodiments, the augmented reality model may be implemented through at least one of a method of generating and outputting one output data obtained by combining reality camera data obtained by photographing an actual task space using the camera and virtual object data, or a method of configuring output data including an actual reality layer and at least one virtual reality layer and then outputting actual reality data in the actual reality layer and concurrently displaying virtual object data in the virtual reality layer.

According to various embodiments, the control device may be configured to: acquire, from the camera, the camera image in which the task space is photographed; recognize a marker (e.g., the marker 120 in FIG. 1 or the marker 220 in FIG. 2) for identifying the position of an object in the camera image; calculate the position of the marker and the position of the robot arm recognized in the camera image; implement the augmented reality model by rendering the virtual object at the position of the marker in the camera image; control the robot arm to perform a task based on the virtual object rendered in the augmented reality model; and acquire control records based on a result of the control of the robot arm.

According to various embodiments, the control records may include at least one of a task time for which the robot arm has actually moved by a random instruction, a task distance by which the robot arm has actually moved, a task speed at which the robot arm has actually moved, a position at which the robot arm is placed, a position at which then object is placed, posture information of the object, failure and success information, augmented reality image information.

Hereinafter, the robot device is illustrated as controlling the method of learning a task technique of the robot device. However, it is natural that the operations of FIGS. 3 to 5 may be performed by the processor 160 of the control device 130.

Figure 3:
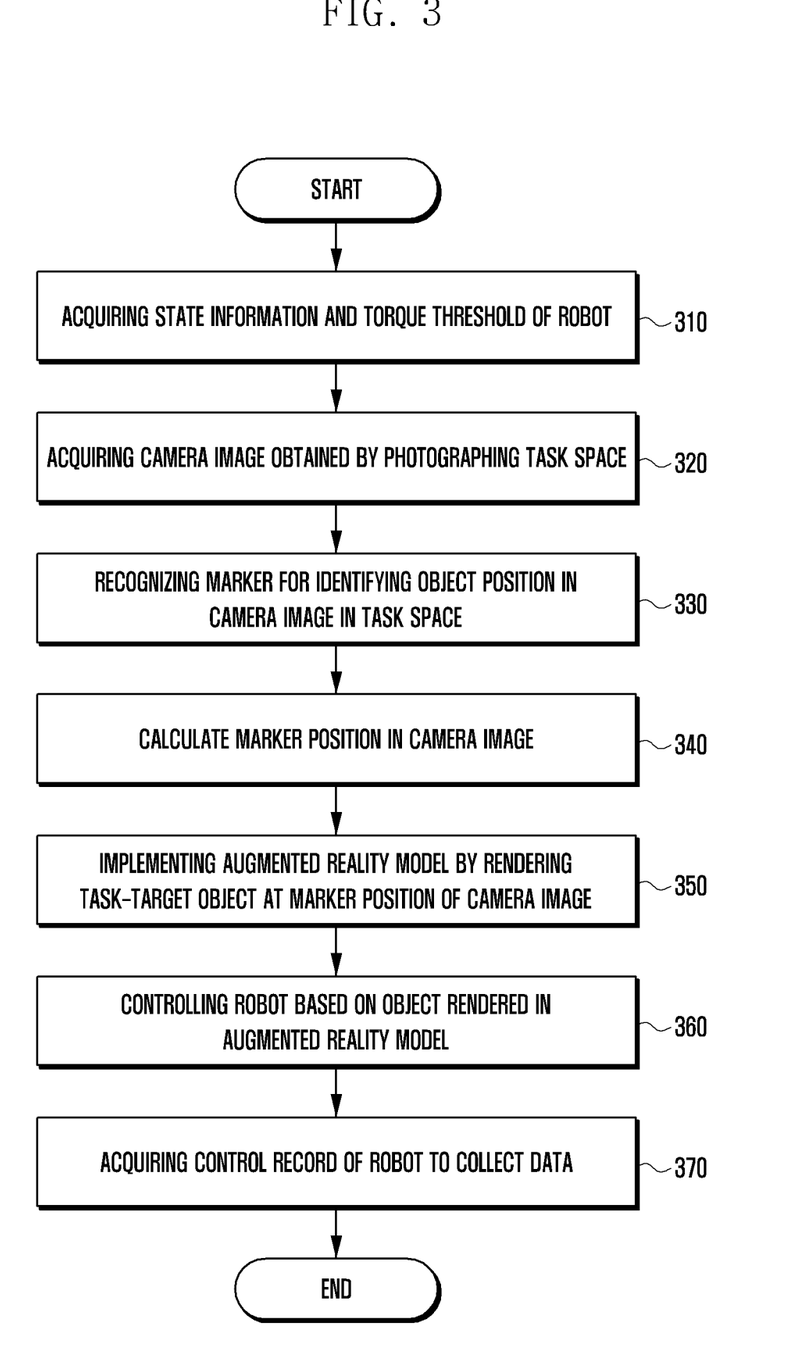
FIG. 3 illustrates a method of learning a task technique of a robot device according to various embodiments.

FIG. 3 illustrates a method of learning a task technique of a robot device according to various embodiments.

Referring to FIG. 3, according to various embodiments, the robot device (e.g., the processor 160 of the control device in FIG. 1) may collect control records of a robot in consideration of an augmented reality model in consideration of the actual task space of the robot. The robot device may collect the recorded control records in consideration of the augmented reality model on which the actual task space of the robot is reflected, but may additionally reflect the control records of a task instruction of the robot in the actual task space for use in a test.

In order to collect the control records of the robot, the robot device may acquire the state information and a torque input value of the robot in operation 310. The status information of the robot may include at least one of, for example, length information of the robot arm, arrangement information of the operation unit, angle and arrangement information of the joint drive unit, information on the position at which the robot arm is placed in the task space, information on the task radius of the robot, and task purpose information of the robot, but is not limited thereto. The torque input value is an input value that gives a command for task instruction of the robot, and may be a motion speed of the robot arm, an angle value of a joint driving unit, a moving value for moving to a certain position, or an input value required to operate the robot. The state information and torque input value of the robot may vary depending on the type of the robot.

In operation 320, the robot device may acquire a camera image in which an actual task space, in which the robot arm is located, is photographed. According to an embodiment, the camera may be mounted together with the robot arm, but is not limited thereto. The camera may be a camera installed in the actual task space. The camera may be installed at a position at which a visual field for the task space of the robot can be secured, may photograph the actual task space of the robot, and may transmit the captured camera image to the control device that controls the driving of the robot arm.

In operation 330, the robot device may recognize a marker for identifying the position of the object in the camera image in which the actual task space is photographed. In performing a task, the robot device should recognize where the target at which the task is to be performed, for example, the position (coordinates and azimuth) of an object, is located around the robot arm in an indoor task space. A marker may be indicated on an object, and may be understood as an artificial mark used to identify the position of the object.

According to an embodiment, the robot device may recognize at least one marker. For example, the robot device may recognize a start marker indicating a position at which an object is placed, and an end marker indicating a position at which a final target position of the object is indicated.

In operation 340, the robot device may calculate a marker position in the camera image. The robot device may calculate the marker position at the position of the robot device based on the captured camera image of the actual task space.

According to an embodiment, the robot device may identify position (coordinate) information of the robot arm based on a position measurement module such as a global positioning system (GPS) module. The robot device may identify information on the direction in which the robot arm is oriented based on a geomagnetic sensor.

According to an embodiment, the robot device may identify the position at which an actual marker is placed based on the camera image in which the task space is photographed, and may then identify a direction in which the actual marker is located from the position at which the robot arm is placed.

According to an embodiment, the robot device may be configured to: identify camera device information, for example, zoom state information and/or angle of view information; implement a 3D space on which the actual environment is reflected based on the camera image in which the task space is photographed based on the identified camera device information; and identify the position at which the robot arm is placed and the position at which the marker is placed in the 3D space.

According to an embodiment, the robot device may measure a distance between the robot arm and the marker based on the position of the robot arm and the position of the marker.

In operation 350, the robot device may implement an augmented reality model by rendering a virtual object corresponding to an actual task-target object at a position at which the marker is placed in the camera image in which the task space is photographed. The virtual object may be rendered including not only the position of the target object but also the posture information of the target object. When a marker is attached to the object, the rendered virtual object may be rendered in the state in which a virtual marker is attached thereto.

According to an embodiment, the camera image may be a 3D camera image having X, Y, and Z axes. The robot device may perform control such that a virtual object corresponding to a task-target object is rendered at a marker position included in the camera image and the rendered virtual object is output on the camera image.

According to an embodiment, the robot device may generate an augmented reality model for the task space by rendering a virtual object on the camera image in which the task space is photographed.

According to an embodiment, the robot device may be configured to: acquire information on a 3D model through a memory or a communication network to correspond to an actual object; and generate a virtual object by mapping/rendering polygon data or text data that can be combined based on a 3D model in real time.

According to an embodiment, the virtual object may further include identification information of an actual task-target object corresponding to virtual object data, and position information in an actual task environment in which the actual object is located.

According to an embodiment, the augmented reality model may be output through a method of generating and outputting one output data obtained by combining reality camera data obtained by photographing an actual task space using the camera and virtual object data, or a method of configuring output data including an actual reality layer and at least one virtual reality layer and then outputting actual reality data in the actual reality layer and concurrently displaying virtual object data in the virtual reality layer, but is not limited thereto.

According to an embodiment, when the robot device is connected to the display, the display may output the augmented reality model in a form in which a virtual object generated to correspond to an object is output on a reality video image, in which the actual task environment is photographed using the camera.

In operation 360, the robot device may control (or instruct) the robot to perform a random motion based on the object rendered from the augmented reality model.

For example, an operator may try to perform a task of holding and lifting a specific object and putting down the specific object at a target point using the robot arm. The robot device may receive a torque input value required for driving the robot arm and state information of the robot, and may perform a motion of holding and lifting the virtual object rendered from the augmented reality model and putting down the virtual object at the target point.

In general, there is a task error range of the robot arm in the robot device. Thus, against the intention of an operator, an error, such as deviation of the position at which an object is placed or failure in the motion of holding and lifting a specific object, may occur.

In operation 370, the robot device may collect data by acquiring control records of the robot in order to estimate a variable parameter at which an error occurs. The control records may be acquired based on result information of a robot motion performed based on the object rendered from the augmented reality model. As the control records, information about a result of an actual task tested by the robot arm in an actual task space may additionally comprise.

For example, the control records may be result information on a task time for which the robot has actually moved in response to a command for the robot to perform a first motion, a task distance by which the robot has actually moved in response to the command, and a task speed at which the robot has actually moved that the robot actually moved in response to the command, but is not limited thereto. The control records may further include elements required for generating control policy function (e.g., state information of a robot in which an actual work environment is considered, augmented reality model information, and result value information according to a torque input value).

Figure 4:
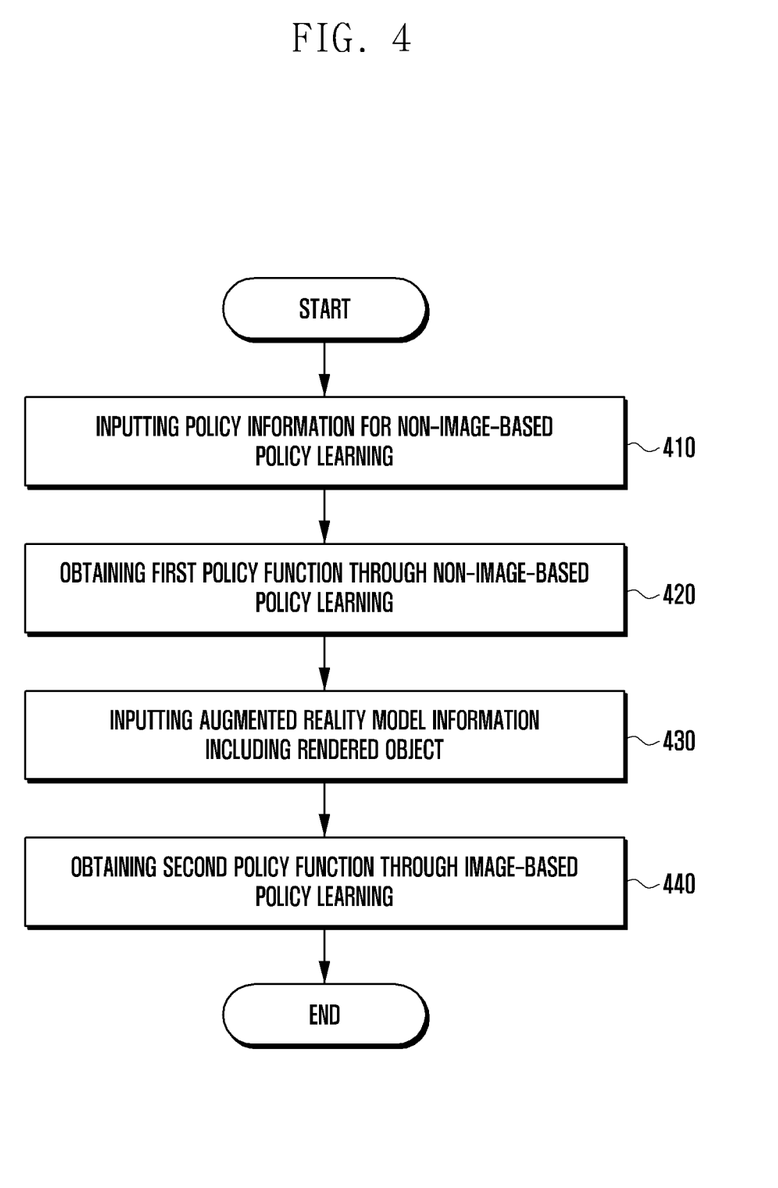
FIG. 4 illustrates a method of learning a task technique of a robot device according to various embodiments.

FIG. 4 illustrates a method of learning a task technique of a robot device according to various embodiments.

Referring to FIG. 4, according to various embodiments, the robot device (e.g., the processor 160 of the control device in FIG. 1) may perform non-image-based policy learning and image-based policy learning based on a random control policy so as to improve the accuracy of task skills In operation 410, the robot device may receive policy information for non-image-based policy learning. As the policy information for non-image-based learning, the state information of the robot, the position and posture information of a task-target object may be input.

According to an embodiment, the robot device may generate a random policy function for generating a control input equation (e.g., $Y=Ax+B\mu$) based on the control records collected through the operation of FIG. 3. Here, x may be a value representing state information of the robot (e.g., the position of the robot arm, the motion radius of the bot arm, the length of the robot arm, etc.), and $\mu$ may be a torque input value (e.g., the position and posture information of the object and a value for executing a motion instruction). A and B may be variable parameters for a policy function, and may be updated through policy learning.

In operation 420, the robot device may obtain a first policy function through non-image-based policy learning. The first policy function may be a policy function in which a random policy function for generating a control input expression (e.g., $Y=Ax+B\mu$) is updated.

According to an embodiment, the non-image-based policy learning may be performed based on at least one of supervised learning, reinforcement learning, optimal control, and model predictive control. For example, reinforcement learning may be a process of updating a policy in which the robot tries a random motion and receives an error as to whether the task is successful (error) as a reward, and generates a control input equation for a desired motion. The supervised learning may be a process of updating a policy by learning based on label information to which information on a correct answer, such as "X is Y", is input.

In operation 430, the robot device may receive image information of an augmented reality model including a rendered object. The robot device may receive image information based on the augmented reality model in which a virtual object corresponding to the task-target object is implemented in a camera image in which an actual task space of the robot is photographed.

In operation 440, the robot device may obtain a second policy function through image-based policy learning. The second policy function may be a policy function obtained by updating the first policy function.

According to an embodiment, the robot device may perform image-based policy learning by repeatedly performing a process of controlling a task on the virtual object by driving the robot arm in the augmented reality image in which the virtual object is rendered based on the first policy function, and a process of recording a result of performing the task.

According to an embodiment, in the image-based policy learning, supervised learning may be performed using a result of non-image-based policy learning, or reinforcement learning may be performed based on image information about an augmented reality model in which the virtual object is implemented.

Figure 5:
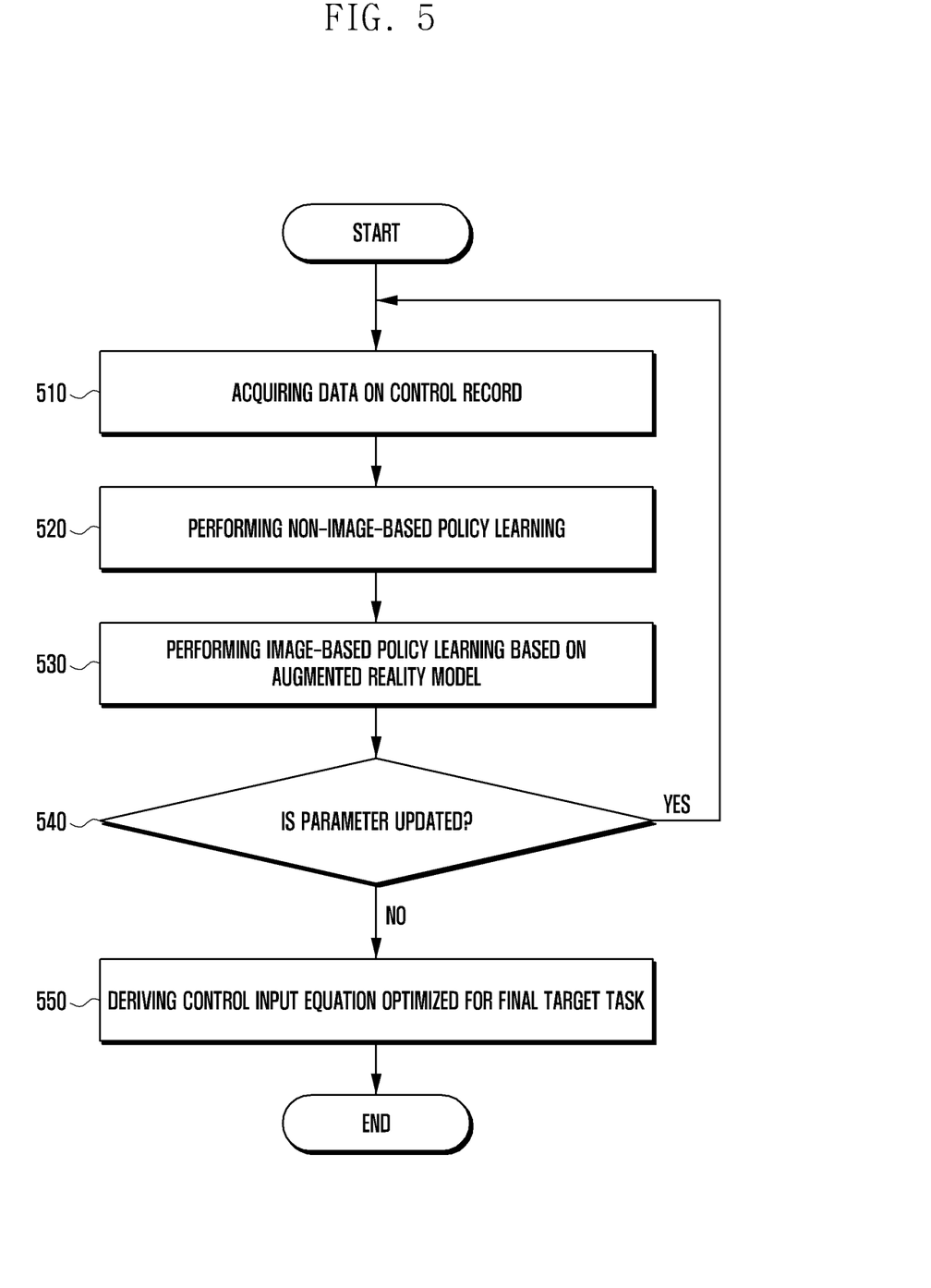
FIG. 5 illustrates a method of learning a task technique of a robot device according to various embodiments.

FIG. 5 illustrates a method of learning a task technique of a robot device according to various embodiments.

Referring to FIG. 5, according to various embodiments, for learning of a robot motion, the robot device (e.g., the processor 160 in FIG. 1) may derive an optimized control input equation for the final task by performing non-image-based policy learning and image-based learning based on a random control input equation.

In operation 510, the robot device may acquire data for control records. The robot device may acquire the control records of the robot through the operation of FIG. 3, and may generate a random policy function for deriving a control input equation of the robot for a target task based thereon.

In operation 520, the robot device may perform non-image-based policy learning using a random policy function. According to an embodiment, the non-image-based policy learning may be performed based on at least one of supervised learning, reinforcement learning, optimal control, and model predictive control.

In operation 530, the robot device may perform image-based policy learning based on the augmented reality model. According to an embodiment, in the image-based policy learning, supervised learning may be performed using a result of non-image-based policy learning, or reinforcement learning may be performed based on image information about an augmented reality model in which the virtual object is implemented.

In operation 540, the robot device may determine whether to update a parameter included in the policy function through the non-image-based policy learning and the image-based policy learning. For example, in the policy learning process, the robot device may determine whether to update the parameter based on information about operation failure and information about operation success of the robot device. When it is necessary to update the parameter included in the policy function, the robot device may return to operation 510 and may redefine a control policy function for deriving a control input equation.

In operation 550, the robot device may derive the final control input equation using an optimized control policy function for performing the final target task when there is no update on the parameter. The final control input equation may be a control input equation used by the operator to generate a command for the robot to perform a certain operation.

According to various embodiments, a method of learning task skills by a robot device may include: an operation of collecting, the robot device (e.g., the robot device 101 in FIG. 1), control records of a robot arm for a random motion; an operation of acquiring, from the camera, a camera image in which a task space of the robot arm is photographed; an operation of implementing an augmented reality model by rendering a virtual object corresponding to an object related to a target task in the camera image; an operation of performing image-based policy learning based on the augmented reality model and the control records; and an operation of updating the control policy for the target task in response to a result of the image-based learning.

According to various embodiments, the operation of performing image-based policy learning may further include: an operation of acquiring a random control policy for performing the target task; an operation of performing a task on the virtual object by driving the robot arm in the augmented reality image in which the virtual object is rendered based on the control policy; and an operation of recording driving information and result information for the virtual object.

According to various embodiments, before the operation of performing the image-based policy learning, the method may further include: an operation of acquiring state information of the robot arm; an operation of acquiring position information and posture information of the object; an operation of acquiring a torque input value required for driving the robot arm; an operation of acquiring a random control policy based on the state information of the robot arm, the position information and the posture information of the object, and the torque input value required for driving the robot arm; and an operation of performing non-video-based policy learning based on the random control policy.

According to various embodiments, the operation of implementing the augmented reality model may further include: an operation of recognizing a marker for identifying a position in the acquired camera image; an operation of measuring a position of the recognized marker and a position of the robot arm; and an operation of rendering a virtual object corresponding to the object to be located at the position of the recognized marker in the camera image.

According to various embodiments, in the operation of implementing the augmented reality model at least one of a method of generating and outputting one output data obtained by combining reality camera data obtained by photographing an actual task space using the camera and virtual object data, or a method of configuring output data including an actual reality layer and at least one virtual reality layer and then outputting actual reality data in the actual reality layer and concurrently displaying virtual object data in the virtual reality layer may be used.

According to various embodiments, the operation of collecting the control records of the robot arm for the random operation may further include: an operation of calculating the position of the marker and the position of the robot arm recognized in the camera image; an operation of acquiring an augmented reality image by rendering the virtual object at the position of the marker in the camera image; an operation of controlling the robot arm to perform a task using the virtual object rendered based on the augmented reality image; and an operation of acquiring control records based on a result of the controlling of the robot arm.

Figure 6:
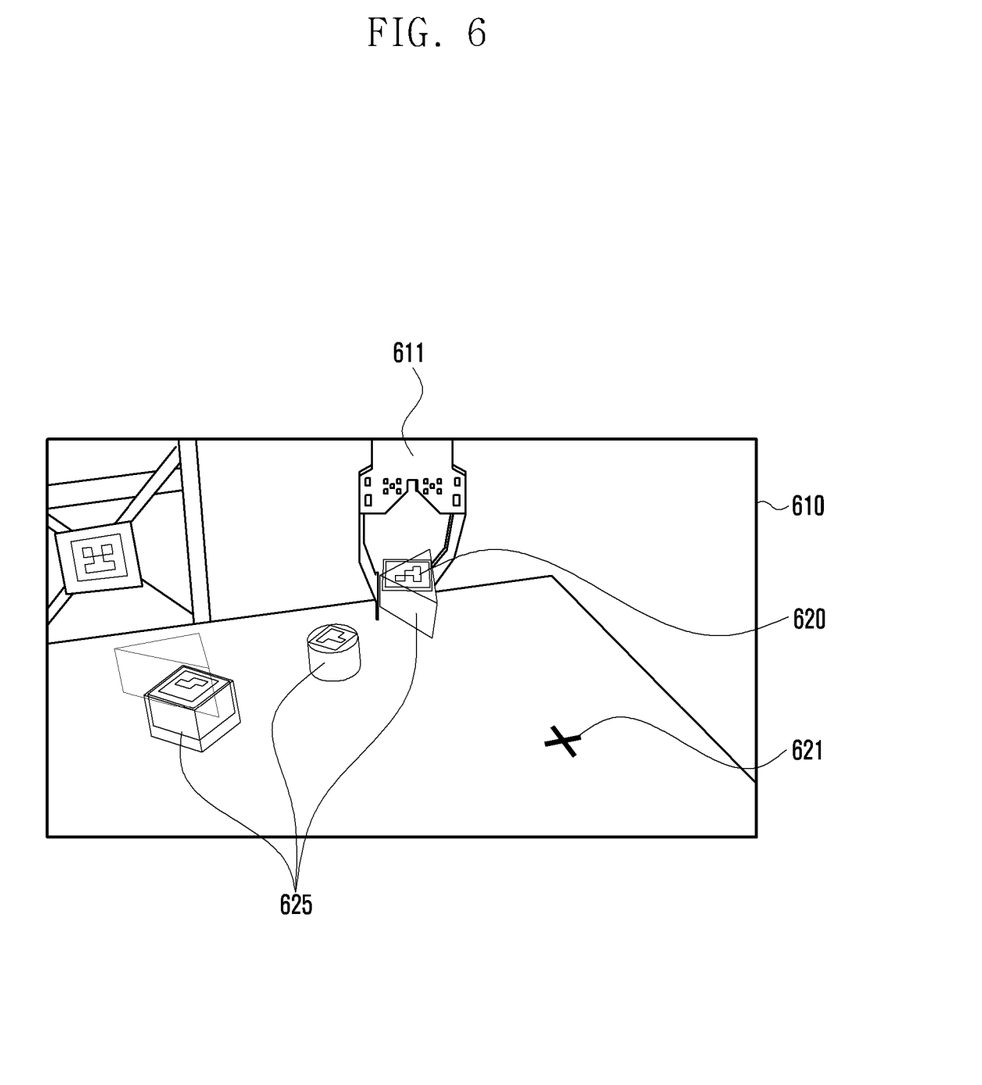
FIG. 6 illustrates an exemplary augmented reality model of a robot device according to various embodiments.

FIG. 6 illustrates an exemplary augmented reality model of a robot device according to various embodiments.

Referring to FIG. 6, according to various embodiments, a robot device (e.g., the robot device 101 in FIG. 1) may implement an augmented reality model (or an augmented reality image) by rendering a virtual object 625 corresponding to an actual task-target object on a camera image 610 in which an actual task space, in which a robot arm 611 is located, is photographed. Reference numeral 610 in FIG. 6 may indicate a camera image in which a task space, in which an actual robot arm 611 is installed, is photographed. The robot arm 610 exhibits the shape of an actual robot arm installed in a task space, and the operation unit of the robot arm 611 photographed in the camera image 610 may be understood as a gripper.

Reference numeral 625 may indicate a virtual object output on the camera image 610. It can be seen that the virtual object may be a virtual object rendered to correspond to a task-target object in the camera image in which the task space is photographed and that a marker for identifying a position is displayed on the rendered virtual object 625.

In the camera image, reference numeral 621 may indicate an end point at which an object held using the robot arm should be finally placed. Even when an actual task-target object is not placed in the task space, the robot arm 611 may be instructed to perform an motion of lifting the virtual object from the position of the virtual object based on the augmented reality model, and to perform a motion of putting down again the virtual object at the end point 621. In this way, the robot device can be improved in the accuracy of task skills by learning a control policy for a robot task by applying an augmented reality model.

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Various embodiments of the disclosure described and shown in the specification and the drawings have been presented as particular examples to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

The invention claimed is:

1. A robotic device comprising:
   a camera;
   a robot arm; and
   a control device electrically connected to the camera and the robot arm, wherein the control device is configured to:
   collect control records of the robot arm for a random motion;
   acquire, from the camera, a camera image in which a task space of the robot arm is photographed;
   implement an augmented reality model by rendering a virtual object corresponding to an object related to a target task in the camera image; and
   perform image-based policy learning based on the augmented reality model and the control records, and update a control policy for the target task.

2. The robot device of claim 1, wherein the control device is configured to:
   generate a random control policy function for the target task based on the control records of the robot arm; and
   update a variable parameter for the random control policy function by performing the image-based policy learning based on the acquired random control policy function.

3. The robot device of claim 1, wherein the control policy comprises a policy function for deriving a control input equation for driving the robot arm.

4. The robot device of claim 1, wherein the control device is configured to:
   acquire state information of the robot arm;
   acquire position information and posture information of the object; and
   further perform non-image-based policy learning based on the state information of the robot arm, the position information and the posture information of the object, and a torque input value required for driving the robot arm,
   wherein the non-image-based policy learning is performed based on at least one of supervised learning, reinforcement learning, optimal control, and model predictive control.

5. The robot device of claim 4, wherein in the image-based policy learning, supervised learning is performed using a result of the non-image-based policy learning, or reinforcement learning is performed based on image information on the augmented reality model in which the virtual object is implemented.

6. The robot device of claim 3, wherein the control device is configured to:
   implement the augmented reality model by rendering the virtual object corresponding to the object on the captured camera image based on a 3D model.

7. The robot device of claim 3, wherein the augmented reality model is implemented through a method of generating and outputting one output data obtained by combining reality camera data obtained by photographing an actual task space using the camera and virtual object data, or a method of configuring output data including an actual reality layer and at least one virtual reality layer and then outputting actual reality data in the actual reality layer and concurrently displaying virtual object data in the virtual reality layer.

8. The robot device of claim 1, wherein the control device is configured to:
acquire, from the camera, the camera image obtained in which the task space is photographed;
recognize a marker for identifying a position of the object in the camera image;
calculate the position of the marker and a position of the robot arm recognized in the camera image;
implement the augmented reality model by rendering the virtual object at the position of the marker in the camera image;
control the robot arm to perform a task based on the virtual object rendered in the augmented reality model; and
acquire control records based on a result of the control of the robot arm.

9. The robot device of claim 1, wherein the control records comprise at least one of a task time for which the robot arm has actually moved by a random instruction, a task distance by which the robot arm has actually moved, a task speed at which the robot arm has actually moved, a position at which the robot arm is placed, a position at which the object is placed, posture information of the object, failure and success information, augmented reality image information.

10. A method of learning task skills by a robot device comprising:
collecting control records of the robot arm for a random motion;
acquiring, from a camera, a camera image in which a task space of the robot arm is photographed;
implementing an augmented reality model by rendering a virtual object corresponding to an object related to a target task in the camera image;
performing image-based policy learning based on the augmented reality model and the control records; and
updating the control policy for the target task in response to a result of the image-based learning.

11. The method of claim 10, wherein the performing of the image-based policy learning further comprises:
acquiring a random control policy for performing the target task;
performing a task on the virtual object by driving the robot arm in the augmented reality image in which the virtual object is rendered based on the control policy; and
recording driving information and result information for the virtual object.

12. The method of claim 10, wherein, before the performing image-based policy learning, the method further comprises:
acquiring state information of the robot arm;
acquiring position information and posture information of the object;
acquiring a torque input value required for driving the robot arm;
acquiring a random control policy based on the state information of the robot arm, the position information and the posture information of the object, and the torque input value required for driving the robot arm; and
performing non-video-based policy learning based on the random control policy.

13. The method of claim 10, wherein the implementing of the augmented reality model further comprises:
recognizing a marker for identifying a position in the acquired camera image;
measuring a position of the recognized marker and a position of the robot arm; and
rendering a virtual object corresponding to the object to be located at the position of the recognized marker in the camera image.

14. The method of claim 10, wherein the implementing of the augmented reality model is implemented using at least one of a method of generating and outputting one output data obtained by combining reality camera data obtained by photographing an actual task space using the camera and virtual object data, or a method of configuring output data including an actual reality layer and at least one virtual reality layer and then outputting actual reality data in the actual reality layer and concurrently displaying virtual object data in the virtual reality layer.

15. The method of claim 10, wherein the collecting of the control records of the robot arm for the random operation further comprises:
calculating the position of the marker and a position of the robot arm recognized in the camera image;
acquiring an augmented reality image by rendering the virtual object at a position of the marker in the camera image;
controlling the robot arm to perform the task using the virtual object rendered based on the augmented reality image; and
acquiring control records based on a result of the controlling of the robot arm.

* * * * *